United States Patent [19]
Olsen et al.

[11] Patent Number: 5,235,145
[45] Date of Patent: Aug. 10, 1993

[54] ELEVATOR WITH LINEAR MOTOR DRIVE ASSEMBLY

[75] Inventors: Eric G. Olsen, Woodbury; Ernest P. Gagnon, Machester; Jerome F. Jaminet, Glastonbury, all of Conn.

[73] Assignee: Otis Elevator Company, Farmington, Conn.

[21] Appl. No.: 819,697

[22] Filed: Jan. 13, 1992

[51] Int. Cl.$^5$ .......................... H02K 41/02; B66B 9/00
[52] U.S. Cl. ...................................... 187/112; 310/13
[58] Field of Search ................... 187/77, 112; 318/135; 310/12, 13

[56] References Cited

U.S. PATENT DOCUMENTS

| 3,602,786 | 8/1971 | Izhelya et al. | 318/135 |
| 4,454,457 | 6/1984 | Nakamura et al. | 318/135 |
| 5,033,587 | 7/1991 | Nakai et al. | 187/77 |
| 5,066,897 | 11/1991 | Ueda et al. | 318/135 |
| 5,090,516 | 2/1992 | Grinaski et al. | 187/112 |
| 5,141,082 | 8/1992 | Ishii et al. | 187/112 |

FOREIGN PATENT DOCUMENTS

| 1453203 | 3/1967 | France | 310/12 |
| 63-117884 | 5/1988 | Japan . | |
| 0103152 | 4/1989 | Japan | 310/12 |
| 0190251 | 7/1989 | Japan | 310/12 |
| 0961060 | 9/1982 | U.S.S.R. | 310/12 |
| 0970584 | 10/1982 | U.S.S.R. | 310/12 |

Primary Examiner—Steven L. Stephan
Assistant Examiner—Thomas M. Dougherty
Attorney, Agent, or Firm—Lloyd D. Doigan; Richard D. Getz

[57] ABSTRACT

A linear motor drive assembly having a first primary and a second primary, with a plurality of highly conductive sheets therebetween is provided. The primaries are fixed to a center support extending lengthwise between the two primaries. In a first embodiment, a pair of highly conductive sheets is arranged between the two primaries, edge to edge, in the same plane. A gap, wide enough to permit the center support to pass through freely, separates the sheets. In a second embodiment, a secondary comprising two halves is also positioned between the two primaries. The two halves are arranged edge to edge, in the same plane, separated by a gap wide enough to permit the center support to pass through freely. Sheets of highly conductive material are fixed to the faces of the secondary halves.

14 Claims, 6 Drawing Sheets fig. 1 fig. 4 fig.5

ELEVATOR WITH LINEAR MOTOR DRIVE ASSEMBLY

DESCRIPTION

1. Technical Field

This invention relates to an elevator linear motor drive assembly.

2. Background Art

Linear motors having a sheet(s) of highly conductive material disposed between a pair of mobile primaries may be employed as drive means for elevators. A primary typically comprises a backing plate, a plurality of laminated plates and a plurality of windings. The laminated plates, which include a plurality of slots, attach to the backing plate to form the body of the primary. The slots within the laminated plates cumulatively form channels that run across the width of the primary. A plurality of windings or coils rest in the channels.

When current passes through a primary coil, a magnetic field encircles the coil, perpendicular to the direction of the current. The current in the primary coils also produces oppositely directed induced currents within the highly conductive sheet disposed between the primaries. The induced currents interact with the magnetic fields to create thrust forces on the primaries.

In one linear motor embodiment, only the sheet of highly conductive material stands between the primaries. The primaries are positioned in close proximity to the sheet, attached to either the elevator car or counterweight assembly. When the linear motor is powered, the primaries are excited 180 degrees out of phase with one another. The magnetic field of each primary, therefore, alternately passes through the highly conductive sheet and accesses the ferromagnetic material of the other primary. In other words, each primary employs the other primary alternately as a portion of the magnetic circuit. As a result, the attractive forces occur only between the two primaries, thereby creating a force balance across the highly conductive sheet.

In another linear motor embodiment, a ferromagnetic secondary is positioned in between the primaries with a sheet of highly conductive material attached to each face. The primaries are positioned in close proximity to the secondary, attached to either the elevator car or counterweight assembly. When the linear motor is powered, the primaries are excited in phase with one another. The magnetic field emanating from each primary, therefore, accesses the same widthwise cross-section of the ferromagnetic secondary at the same time. As a result, the attractive forces of each primary acting on the secondary offset the attractive forces of the other primary, thereby creating a force balance across the secondary.

All flat linear motors have motor windings which include numerous coil ends extending out from the metallic body of the primary. The shape of each coil end is determined by the smallest geometry possible which still permits the motor windings to be routed through the metallic body of the primary. Since the coil ends extend a length outside the body of the primary, they do not participate in the motor thrust and consequently do not increase the efficiency of the motor. In fact, the coil ends create joule losses thereby decreasing the efficiency of the motor.

Japanese Patent Publication No. 63-117884 by Mitsui teaches a four-motor configuration having two pairs of motors symmetrically opposed to one another. Mitsui's multi-motor arrangement, with four similar primaries, has the same ratio of primary body width to coil end length as a linear motor with a single primary of similar body width. To illustrate, each primary in the multi-motor arrangement has a body width "L" and coil end length "2E". All four primaries together therefore have a body width to coil end length ratio of "4L/8E" or "L/2E", which is the same as a single primary with a body width "L" and coil end length "2E". Therefore, whatever ineffeciencies are associated with the ratio of primary body width to coil end length in the single primary, are also present in each of the four primaries employed in Mitsui, assuming that all other variables such as the numbers of windings remain constant.

Simply increasing the body width of the primary does not solve all the problems, however. The primary is subject to large attractive forces relative to the secondary or other primary, and as a result tends to deflect. Changing the width of the primary a small amount drastically changes the deflection of the primary, because the deflection directly relates to the cube of the width of the primary. In short, if the width of the primary is too narrow, the inefficiencies presented by the end windings are magnified. On the other hand, if the primary width is too great, it will deflect and negatively effect the integrity of the air gap.

In sum, what is needed is a new multiple linear motor arrangement that optimizes motor performance.

DISCLOSURE OF THE INVENTION

It is, therefore, an object of the present invention to increase the efficiency of the a multiprimary linear motor arrangement.

It is a further object of the present invention to provide a linear motor which minimizes fabrication and installation expenses.

It is a still further object of the present invention to minimize deflections of the primary.

According to the present invention, a linear motor drive assembly having a first primary and a second primary, with a plurality of highly conductive sheets therebetween is provided. The primaries are fixed to a center support extending lengthwise between the two primaries. In a first embodiment, a pair of highly conductive sheets is arranged between the two primaries, edge to edge, in the same plane. A gap, wide enough to permit the center support to pass through freely, separates the sheets. In a second embodiment, a ferromagnetic secondary comprising two halves is also positioned between the two primaries. The two halves are arranged edge to edge, in the same plane, separated by a gap wide enough to permit the center support to pass through freely. Sheets of highly conductive material are fixed to the faces of the secondary halves.

The configuration of the primaries in the present invention increases the efficiency of the multiple linear motor arrangement in two ways. First, the use of a pair of primaries parallel to one another on opposite sides of the secondary with a center support in between minimizes the collective number of end windings. Since each end winding produces joule losses, minimizing the number of end windings increases the efficiency of the linear motor. Second, connecting the inner and outer primary with the center support decreases the deflection of the primaries. Since the deflection is directly related to the cubed width of the primary, effectively halving the width of the primary decreases the deflection significantly. Consequently, the integrity of the air gap is maintained and the inefficiencies associated with air gap fluctuation are minimized.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
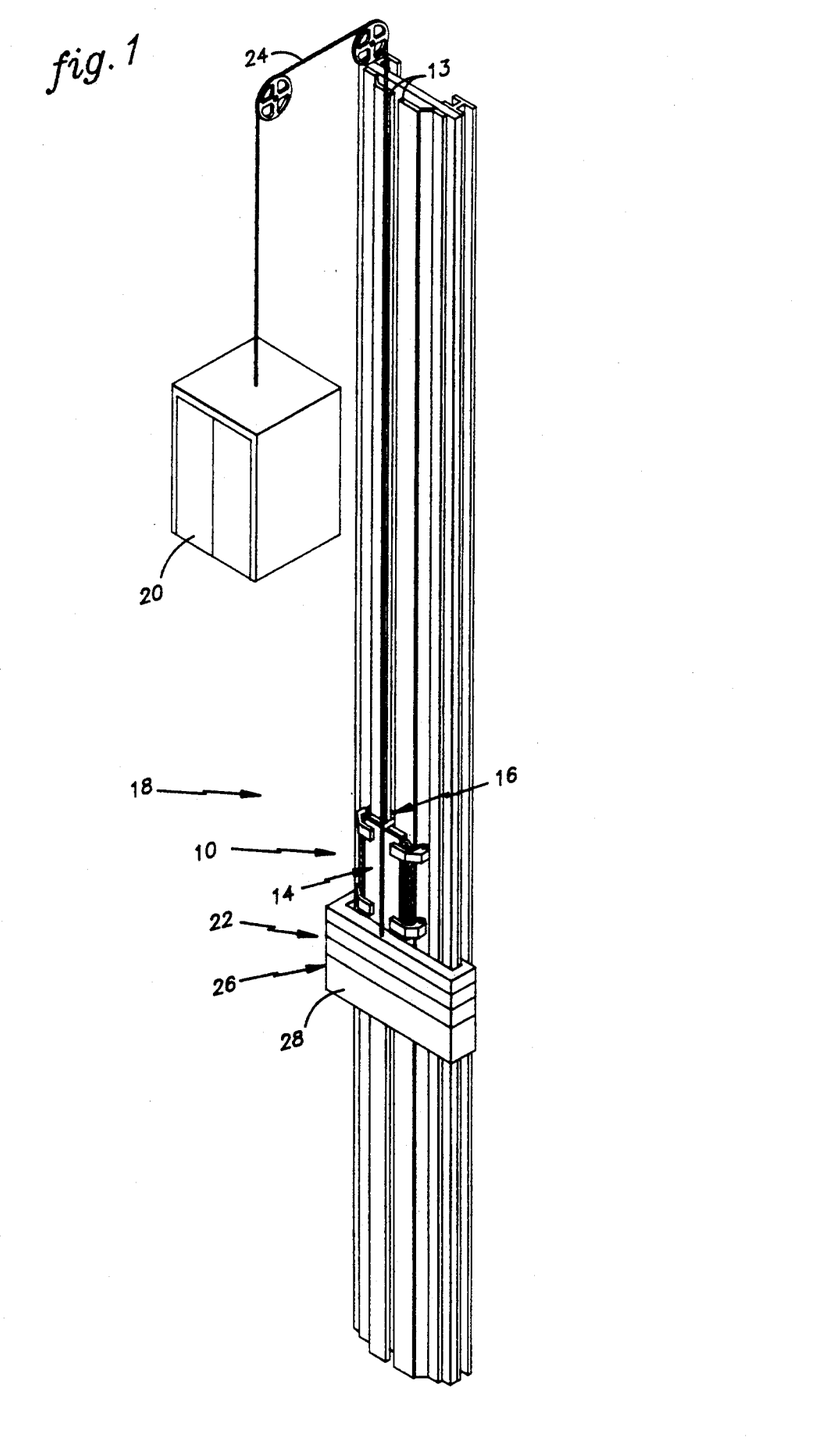
FIG. 1 is a schematic drawing of an elevator comprising a counterweight assembly, having a linear motor, and an elevator car attached to one another by a series of ropes.

Referring to FIG. 1, a linear motor 10 comprising a first primary 14 and a second primary 16, with a plurality of sheets 13 of highly conductive material in between is shown. The motor provides motive power for an elevator 18. The elevator comprises an elevator car 20 and a counterweight assembly 22 in a hoistway (not shown), attached to one another by a series of ropes 24 as is known in the art. The counterweight assembly 22 includes the primaries 14,16 of the linear motor and a frame 26 attached to the primaries. The frame 26 includes a means for attaching weights 28 to the counterweight assembly 22, should additional weight be necessary to balance the load between the elevator car 18 and the counterweight assembly 22.

Figure 2:
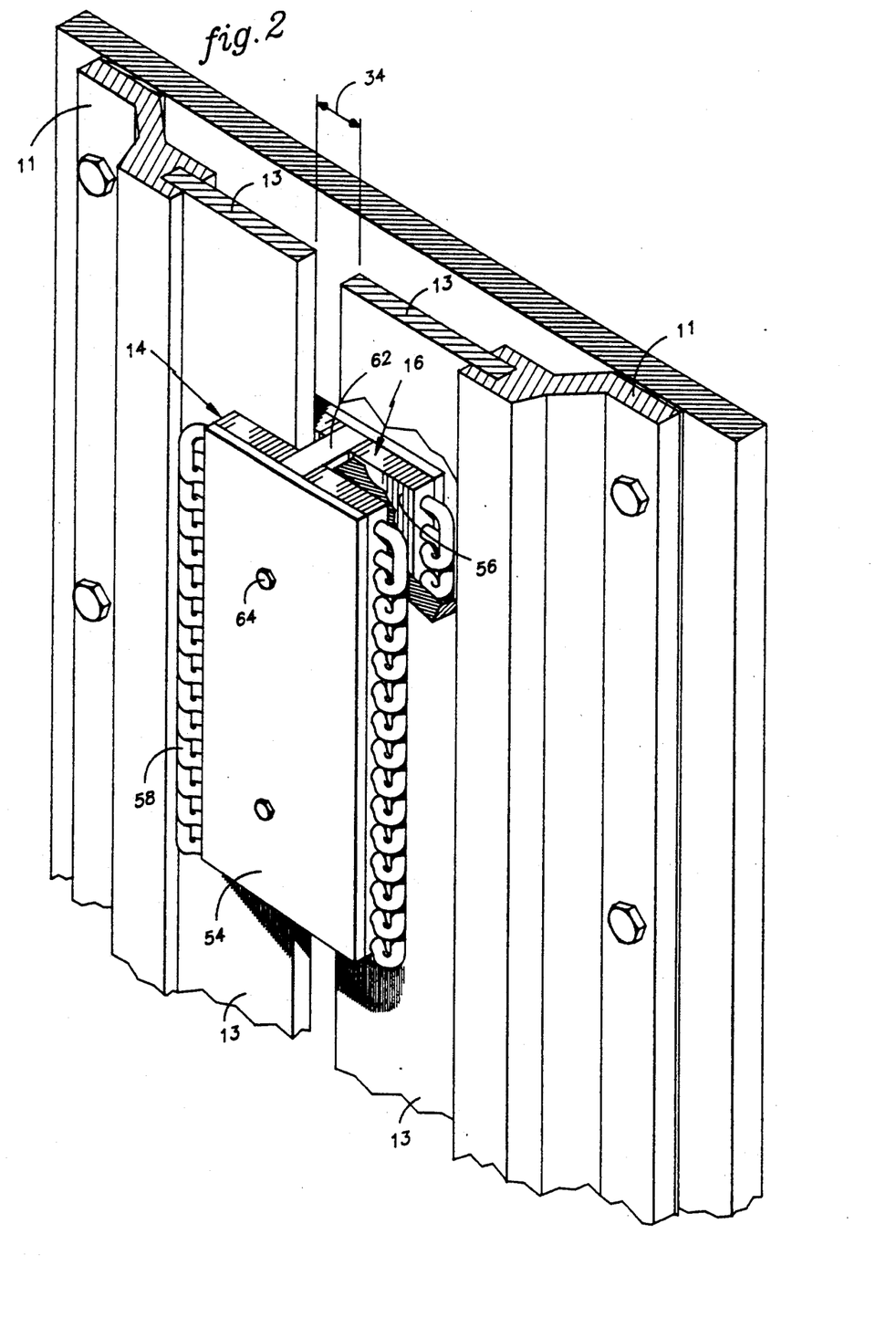
FIG. 2 shows a first embodiment comprising the first and second primaries and two highly conductive sheets supported and positioned within the hoistway by a pair of shoulders.

Referring to FIG. 2, in a first embodiment, a pair of shoulders 11 supports and positions two highly conductive sheets within the hoistway. The shoulders 11 extend outwardly from the hoistway wall at an angle toward each other. The highly conductive sheets 13, in turn, extend outward from each shoulder 11, and are arranged edge to edge, in the same plane. A fixed distance gap 34 separates the edges of the sheets 13.

Figure 3:
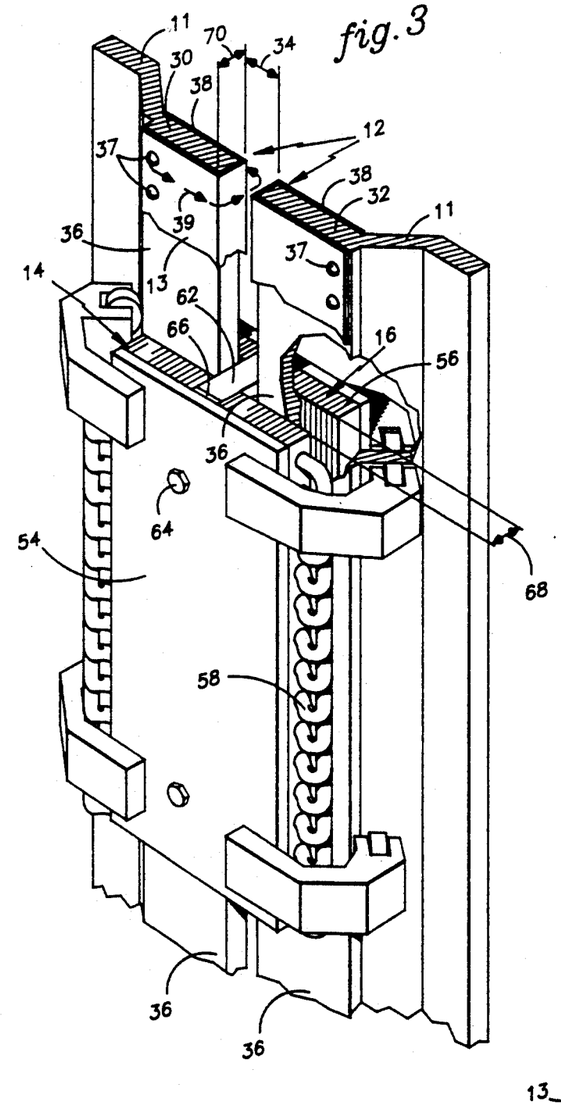
FIG. 3 shows a second embodiment comprising the first and second primaries and a secondary comprising a left and a right half, supported and positioned within the hoistway by a pair of shoulders.
Figure 3A:
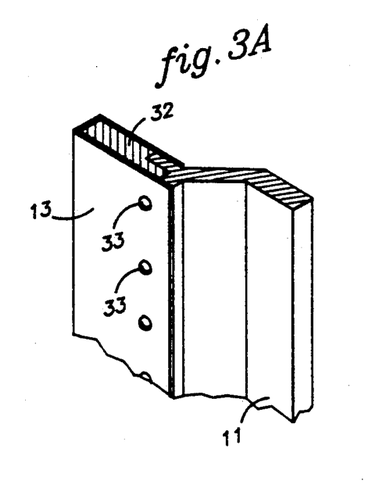
FIG. 3A shows a detachable secondary half attached to a shoulder.

Referring to FIG. 3 and 3A, in a second embodiment, the shoulders 11 support and position a ferromagnetic secondary 12 comprising a left half 30 and a right half 32. The shoulders 11 are fixed within the hoistway in the aforementioned manner, extending outwardly from the hoistway wall, toward each other. The halves 30,32 of the secondary 12 are likewise arranged edge to edge, in the same plane, separated from each other by a gap 34 of fixed distance. The secondary halves 30,32 may be integrally attached (FIG. 3) to the shoulders 11 or may be conventionally attached by bolts 33, for example (FIG. 3A). A person of skill in the art will recognize that a number of different shoulder 11 configurations may be employed to hold either the highly conductive sheets 13 of the first embodiment or the secondary halves 30,32 of the second embodiment in the edge to edge, coplanar arrangement previously described.

Referring to FIG. 3, each primary 14,16 comprises a backing plate 54, a plurality of laminated plates 56 attached to the backing plate and a plurality of windings 58, as is known in the art. The windings 58 run through the laminated plates 56, across the entire width of the primary 14,16, and extend outward on each side. When current is passed through a winding 58, a magnetic field encircles the winding, perpendicular to the direction of the current.

Figure 4:
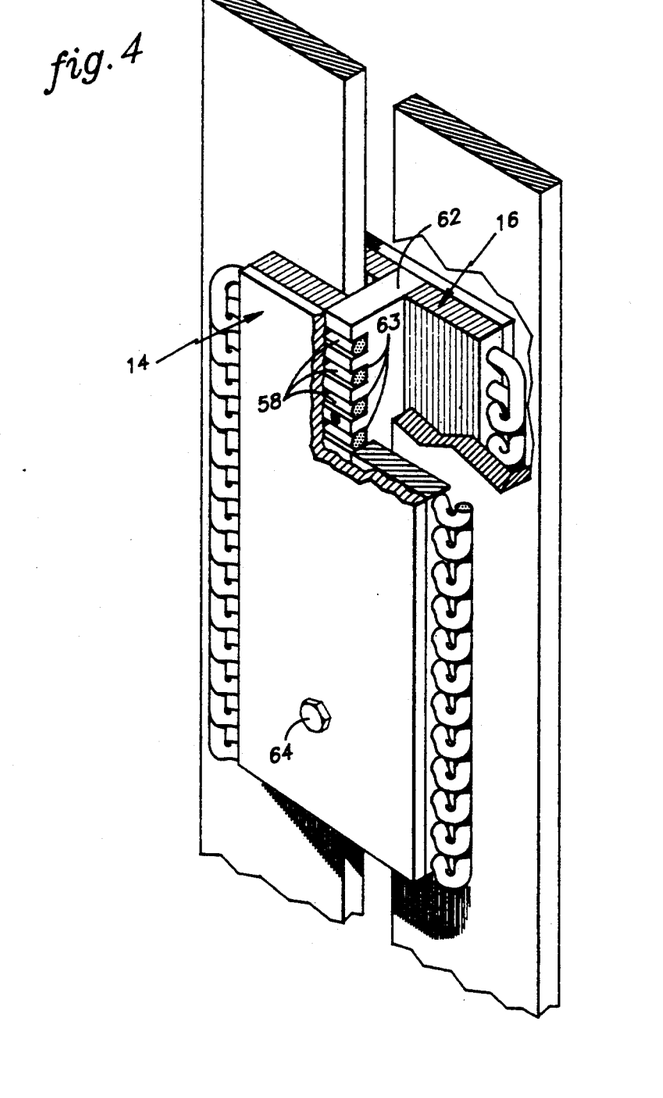
FIG. 4 is a sectional drawing of the primaries and secondary halves as shown in FIG. 3, which further illustrates the center support.

Referring to FIG. 4, the first 14 and second 16 primaries, positioned parallel to one another, are attached through a center support 62 which runs lengthwise along the primaries 14,16. The center support 62 comprises a plurality of channels 63 which fit over the windings 58, thereby permitting the windings to extend across the entire width of the primary. In the ideal case, the center support 62 comprises a purely non-conductive, insulative material. Practically speaking, the load bearing support 62 may be fabricated from a number of different materials with varying insulative qualities such as hard plastics, ceramics, and non-magnetic stainless steel. The two primaries 14,16 attach to one another by bolts 64, or other conventional means, which extend through the center support 62. A person of ordinary skill in the art will appreciate that the center support 62 and the primaries 14,16 may be attached to and insulated from one another in a number of different ways.

Referring to FIG. 3, when the primaries 14,16 are in position relative to either the highly conductive sheets or the two halves 30,32 of the secondary 12, the center support 62 extends through the fixed distance gap 34 separating the two sheets or halves. For example, in the second embodiment, the first primary 14 lies parallel to the first side 36 of the each half of the secondary 12 and the second primary 16 lies parallel to the second side 38 of each half of the secondary. Shims 66, employed between the center support 62 and one or both primaries 14,16, permit adjustment of the total distance 68 between the two parallel primaries. Once the overall width 70 of the secondary 12, including the highly conductive sheets 13, is determined, that value 70 is subtracted from the distance 68 between the two primaries. Shims 66 are accordingly added or removed until the difference is twice the separation distance sought. A similar procedure is followed for the first embodiment.

Referring to FIG. 2, in the first embodiment, both primaries 14,16 are excited 180 degrees out of phase with one another. The magnetic field of each primary, therefore, alternately passes through the highly conductive sheet 13 and accesses the ferromagnetic material of the other primary. In other words, each primary 14,16 employs the other primary 16,14 alternately as a portion of the magnetic circuit. As a result, the attractive forces of each primary 14,16 occur only between the two primaries, thereby creating a force balance across the highly conductive sheets 13.

Referring to FIG. 3, in the second embodiment, both primaries 14,16 are excited in phase with one another. The magnetic field emanating from each primary 14,16, therefore, accesses the same widthwise cross-section of the ferromagnetic secondary halves 30,32 at the same time. As a result, the attractive forces of each primary 14,16 acting on the secondary offset the attractive forces of the other primary 16,14, thereby creating a force balance across the secondary 12.

The current in the primary coils also produces oppositely directed induced currents within the highly conductive sheet. In the second embodiment (FIG. 3), each secondary half is substantially enclosed by a sheet of highly conductive material 13, such as aluminum or copper. The ends of the highly conductive sheet are connected by electrically conductive mechanical means 37, thereby forming a complete electrical path 39 around the secondary for the induced currents to follow.

Figure 5:
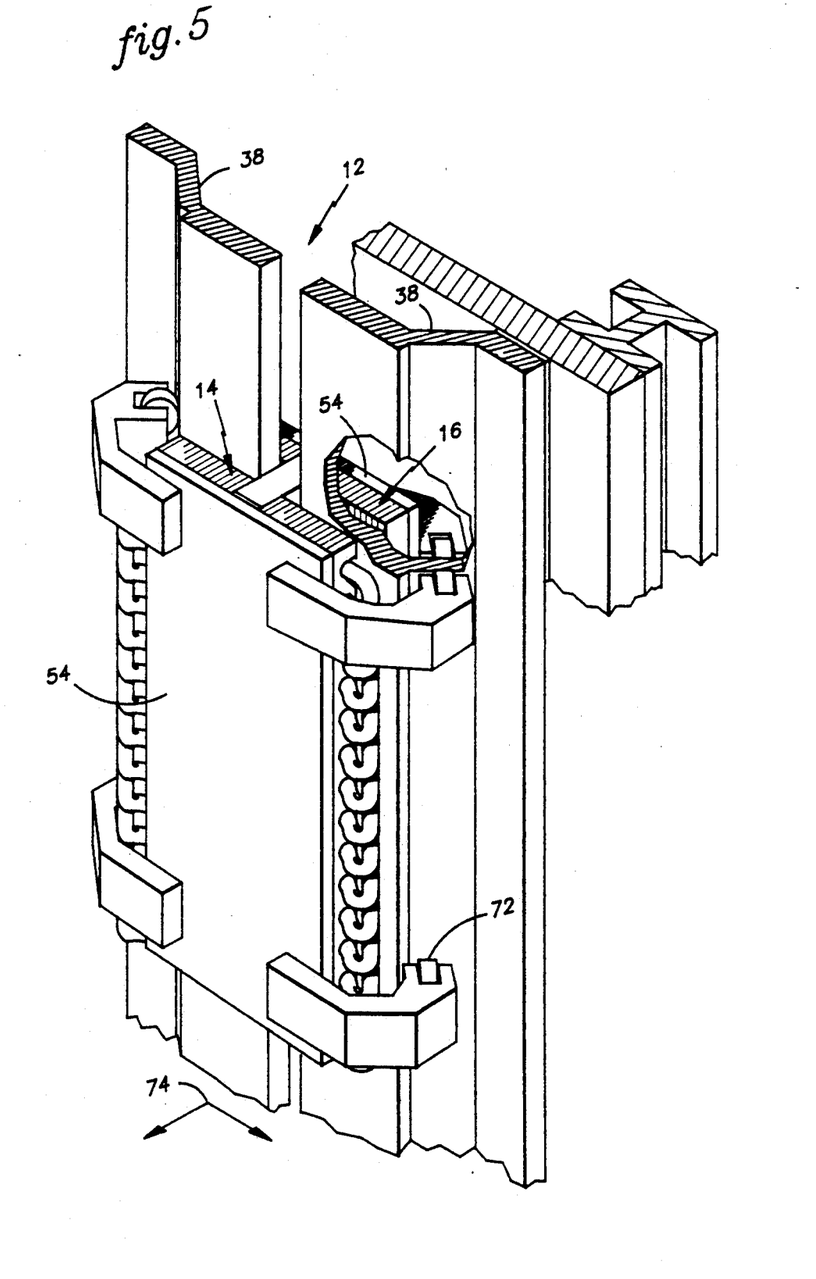
FIGS. 5 and 6 are two embodiments showing roller arrangements for positioning the primaries within the hoistway of the elevator.

Referring to FIG. 5, rollers 72 attached to the counterweight assembly 22 facilitate the travel of the primaries 14,16 within the hoistway, as is known in the art. The rollers 72 bear the primary attractive forces that exist beyond that canceled by the force balance between the two primaries 14,16 across the sheets or the secondary 12. In addition, the rollers also adjust to permit centering of the sheets or the secondary 12 relative to the primaries 14,16. The primaries 14,16 must be centered relative to the sheets 13 and/or the secondary 12 to preserve the force balance therebetween, since the attractive forces are directly related to the separation distance between each primary 14,16 and the ferromagnetic material its flux accesses. In one embodiment, the rollers 72 operate against the angularly displaced shoulders 38. The advantage to this configuration is that the rollers constrain the motion of the primaries in two axes of direction 74.

Figures 6, 7:
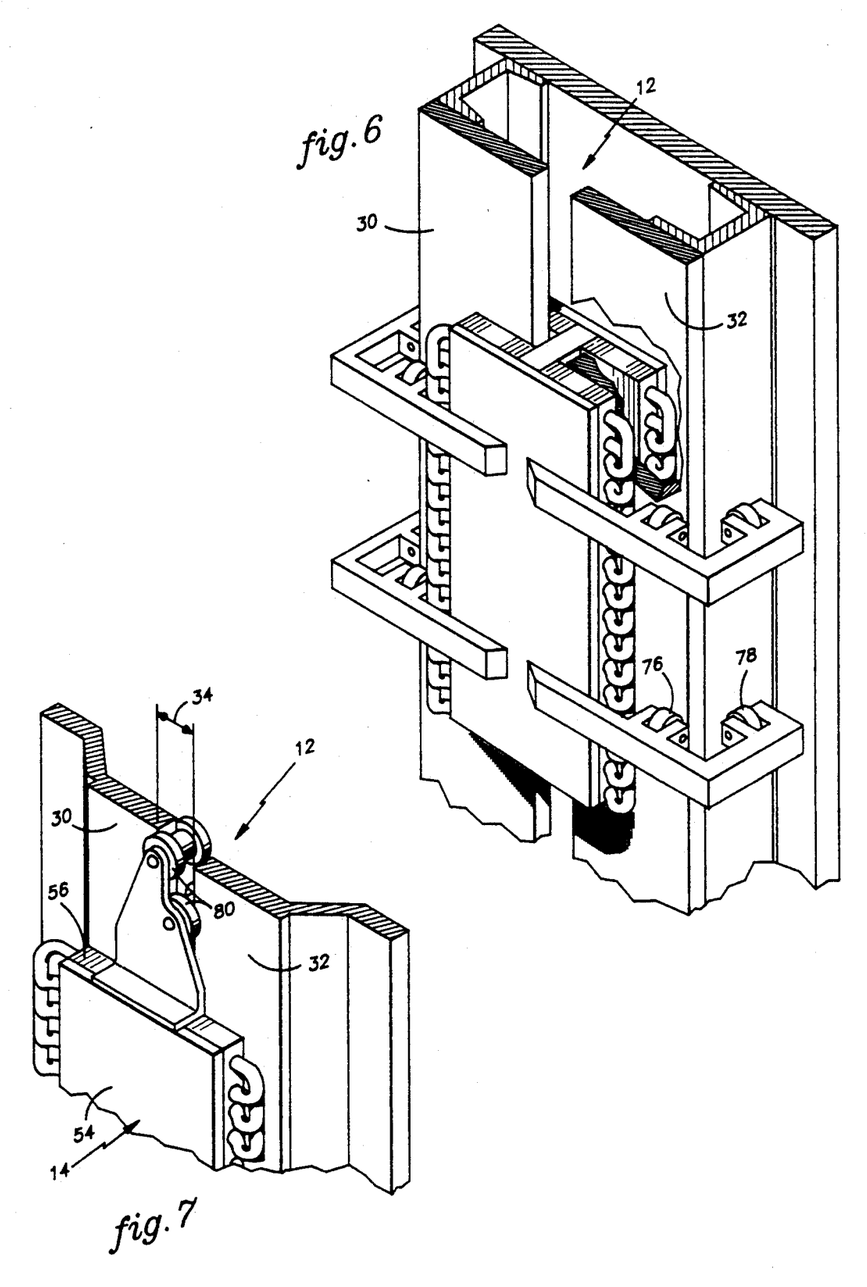
FIG. 7 illustrates an embodiment of a roller configuration in which channeled rollers are employed in the gap between the two halves of the secondary.

Referring to FIG. 6, another embodiment has a first set of rollers 76 acting on either the faces of the flanges 44 holding the sheets or the halves 30,32 of the secondary 12 (outside the region covered by the layer 46 of highly conductive material if present). A second set 78 of rollers acts against the web of the flanges 44. Both sets of rollers 76,78 adjust to facilitate positioning of the primaries relative to the secondary. Both sets of rollers 76,78 combine to constrain the motion of the primaries 14,16 in two axes of direction 74.

Referring to FIG. 7, a third embodiment has two sets of channeled rollers 80 in the fixed separation gap 34 between the two halves 30,32 of the secondary 12. A set is attached to a backing plate 54 above the laminated plates 56 of the primaries 14,16 and another set below. One of the channeled rollers 80 in each set acts against the left half 30 of the secondary 12 and the other acts against the right half 32. Each set adjusts to permit centering of the secondary 12 relative to the primary(s) 14,16 in two planes, parallel and perpendicular to the secondary. A person of skill in the art will appreciate that roller configurations representing hybrids of the aforementioned embodiments may also be used.

These and other objects, features and advantages of the present invention will become more apparent in light of the detailed description of the best mode embodiment thereof, as illustrated in the accompanying drawings.

We claim:

1. A linear motor for providing motive force to an elevator comprising:
   a first primary;
   a second primary;
   a plurality of highly conductive sheets, arranged edge to edge in a plane, separated by a gap; and
   a center support, extending between and attached to both of said first and second primaries, and through said gap between said sheets, such that said first and second primaries are positioned in close proximity to said sheets.

2. A linear motor for providing motive force to an elevator according to claim 1, wherein said center support further comprises a plurality of channels, wherein a plurality of windings attached to said primaries pass through said channels.

3. A linear motor for providing motive force to an elevator according to claim 1, further comprising:
   a pair of shoulders, for supporting and positioning said sheets; and
   a plurality of rollers, attached to said primaries, operating against said shoulders.

4. A linear motor for providing motive force to an elevator according to claim 3, wherein said rollers constrain the motion of the primaries in two axes of direction.

5. A linear motor for providing motive force to an elevator according to claim 1, further comprising:
   a pair of flanges, each having a face, attached to said sheets, for supporting and positioning said sheets; and
   a plurality of rollers, attached to said primaries, operating against said flanges and said flange faces.

6. A linear motor for providing motive force to an elevator according to claim 5, wherein said flanges are attached to and extending outwardly at an angle from said sheets of said secondary, for supporting and positioning said sheets, and wherein said rollers constrain the motion of said primaries in two axes of direction.

7. A linear motor for providing motive force to an elevator comprising:
   a second, having a left half and a right half arranged edge to edge, in a plane, separated by a gap;
   a first primary, having a plurality of windings;
   a second primary, having a plurality of windings, and
   a center support, extending between and attached to both of said first and second primaries, through said gap between said halves of said secondary, such that said first and second primaries are positioned in close proximity to said left and right halves of said secondary.

8. A linear motor for providing motive force to an elevator in a hoistway according to claim 7, further comprising:
   a plurality of highly conductive sheets, fixed to said secondary halves, between said secondary and each of said primaries.

9. A linear motor for providing motive force to an elevator according to claim 7, further comprising:
   a pair of shoulders, for supporting and positioning said halves; and
   a plurality of rollers, attached to said primaries, operating against said shoulders.

10. A linear motor for providing motive force to an elevator according to claim 9, wherein said rollers constrain the motion of the primaries in two axes of direction.

11. A linear motor for providing motive force to an elevator according to claim 7, further comprising:
    a pair of flanges, attached to said halves of said secondary, for supporting and positioning said halves; and
    a plurality of rollers, attached to said primaries, operating against said flanges and said halves.

12. A linear motor for providing motive force to an elevator according to claim 11, wherein said flanges are attached to and extending outwardly at an angle from said halves of said secondary, for supporting and positioning said halves, and wherein said rollers constrain the motion of said primaries in two axes of direction.

13. A linear motor for providing motive force to an elevator according to claim 7, further comprising:

a plurality of channeled rollers, attached to said primaries, operating in said gap between said halves of said secondary, against said halves, for positioning said primaries relative to said secondary.

14. A linear motor for providing motive force to an elevator according to claim 7, wherein said center support further comprises a plurality of channels, wherein said windings of said primaries pass through said channels.

* * * * *